Patented Mar. 6, 1934

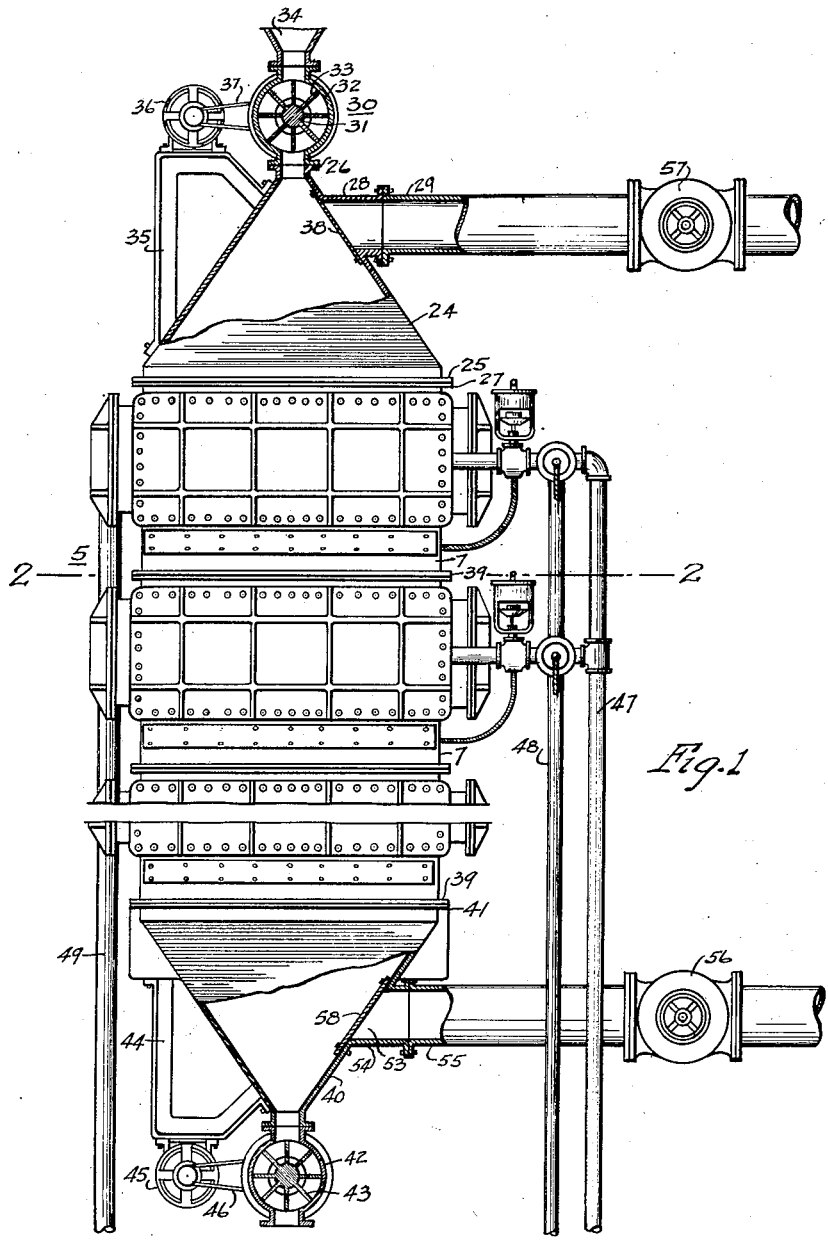

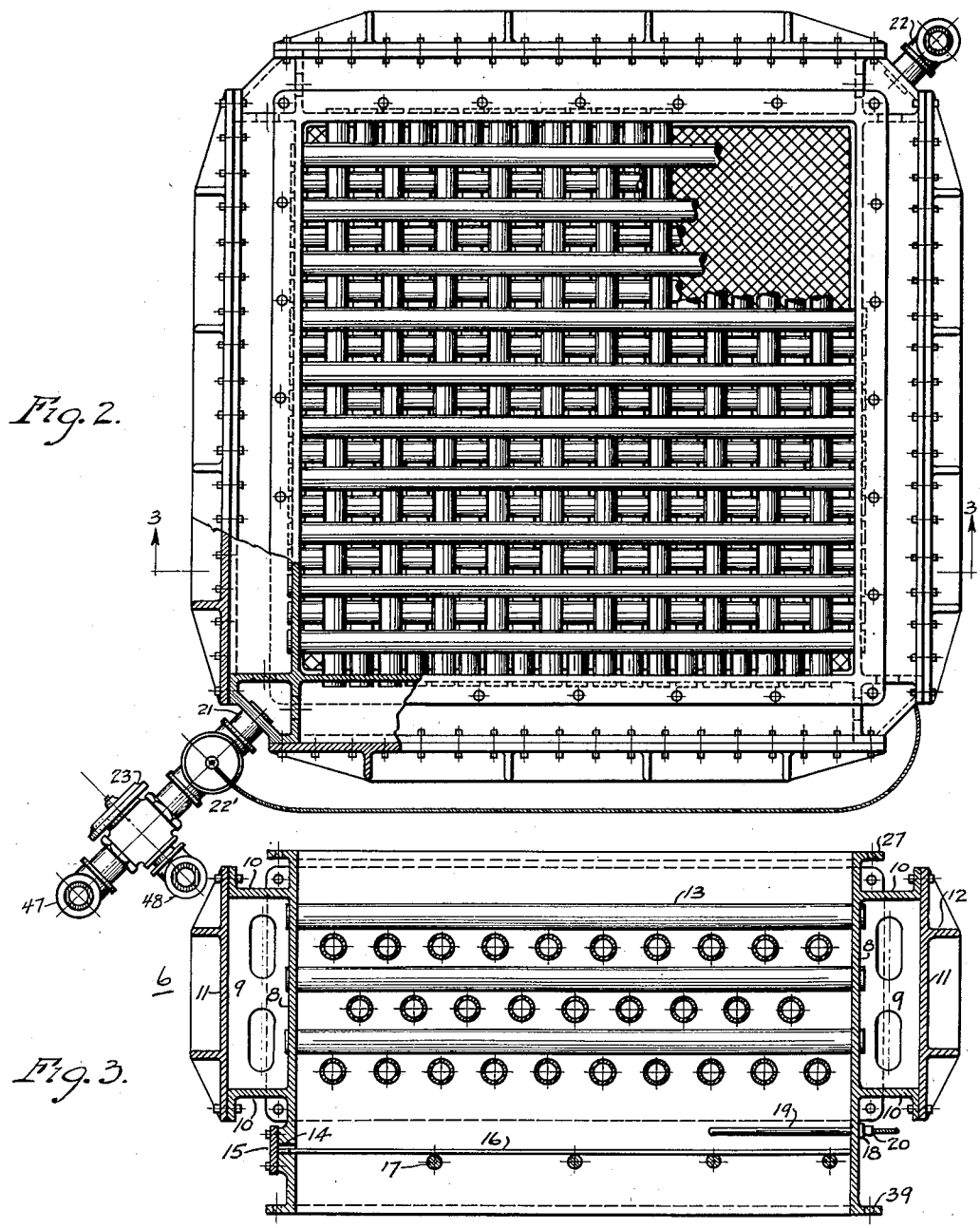

1,949,427

UNITED STATES PATENT OFFICE 1,949,427

PROCESS FOR DRYING GRAIN, SEEDS, AND THE LIKE IN VACUA APPARATUS THEREFOR

Alfred H. McComb, Chicago, Ill., assignor of one-half to Everette R. Peacock, Chicago, Ill.

Application February 23, 1929, Serial No. 341,984

5 Claims. (Cl. 34—24)

The present invention relates in general to apparatus and process for vacuum drying of grains, seeds, malt and the like.

One of the objects of my invention is to provide a process of drying seeds and grains under a vacuum whereby the germination factor of such seed is greatly increased.

Another object is to provide a method of drying wherein the seeds or grains will have the proper percentage of water content so that the grains may be stored for long periods of time without any deteriorating effects and may be transported without spoiling.

Another object is to provide a drying process wherein the grain may be quickly prepared with proper water content for marketing so as to meet standard marketing requirements by a novel method whereby the quality of the grain is not altered except to improve it.

Another object is to provide a vacuum dryer for grains that will be continuously operating so that a large amount of grain can be handled in a relatively short space of time.

Another object is to provide such drying apparatus wherein these results can be accomplished with a relatively small amount of apparatus.

Another object is to provide a dryer of this character with temperature controlled zones or stages so that the grain may be dried by my novel process.

Another object is to provide drying apparatus which may be regulated to meet various conditions encountered in the drying of different grains, as well as in grains of the same kind but with a different water content.

Another object is to provide an improved drying process whereby the texture, quality and color of the grain is materially improved over that obtained from ordinary drying processes.

A still further object is to provide a drying process which will not alter the vitamin content or any other nutritive properties of the grain or seed so as to injuriously effect its food value and which will increase its power of germination.

There are other objects of my invention, which together with the foregoing, will be described in the detailed specification which is to follow, taken in conjunction with the accompanying drawings.

Many methods of drying grains have been proposed heretofore. Generally these may be divided in two broad classes, one of which may be designated as an air drying process and the other may be designated as a vacuum drying process. In air drying the moisture is removed from the product by streams of heated air, passing over the grain for certain lengths of time. In this system it is impossible to control the amount of moisture removed from the grain, in addition, the grain is always oxidized to some extent with the consequent destruction of many nutritive properties of the grain as well as its ability to germinate. Again the vitamin content of the grain is destroyed by oxidization and, as this is an important factor, both from a food standpoint and from its effect on the germination power of the grain, it is highly objectionable. Furthermore, no matter how much care is taken with this air drying process, there is a tendency for the kernels to become blistered, thereby making the grain mealy and the texture, quality and color is injuriously affected.

In vacuum drying processes, the drying of the grain occurs in a vacuum under very low air pressure. A number of the objections pointed out above are eliminated by this process but the vacuum method of drying as heretofore practiced is entirely unsuited to quantity production, and it is impossible to regulate the amount of moisture taken from the product. In addition, it is hard to maintain the vitamin content of the grain and its germination power is not improved to any extent. In fact, the germinating power is usually decreased.

The process illustrated and described in my copending application, Serial #245,076 filed January 7, 1928, illustrates a method of drying, which removes a number of those objections. However, even this process is unsuited for quantity drying of grain, wherein it is only desired to withdraw a portion of the moisture content to meet marketing conditions and to improve the germination quality thereof.

In view of these disadvantages, I have developed a new process and drying apparatus, which will adequately handle the drying of grains and seeds in large quantities which improves, as before stated, the texture, quality, color and germination capability of the grain or seed, and one which will permit the grain to be stored for relatively long periods of time without danger of spoiling.

Briefly, my improved process consists in removing the moisture from the grain until there remains approximately a 17½% moisture content under a vacuum. This is accomplished by feeding the grain into a vacuum drying apparatus which comprises a plurality of tiers of pipes at right angles to each other segregated into different zones or sections. The pipes from the various sections or zones are connected into a usual header and through an automatic temperature regulating valve to a water line and to a steam line. The temperature of the fluid circulating through the pipes in its section is automatically controlled by this mixing valve. Different temperatures are maintained in each of these sections, depending upon the kind of grain that is passed through the dryer so that the water content is removed step by step and also so that when the product passes through the vacuum dryer it will be cool and there will be no oxidizing reaction after the drying operation.

By employing this drying process, it is possible to reduce the moisture content of the grain the desired amount in approximately 30 minutes. The former methods outlined above require as many as 1 to 24 hours.

One of the novel results attained by this vacuum seed dryer construction is that the absorbed occluded gases in the product are utilized during the vacuum drying operation and serve to bring about some convection drying of the product. The use of these gases, together with the water vapor rising from the grains in one zone and passing through the grain in another zone, serves to super heat and to remove some of the moisture from the remainder of the grain as it passes through so that the drying operation takes place in a relatively short period of time. I have determined in this type of vacuum dryer, where the occluded gases and vapors are permitted to heat by convection that the drying period is hastened from 20% to 50% over the usual type of vacuum dryers and 60% or more over air dryers. This means that the output of the dryer is increased in the same relative proportion depending upon the kind of grain that is being dried.

Many reasons have been assigned to explain the question of germination in seeds and grain. It has been discovered that while in most instances from 40 to 80% of the grain will germinate, the remainder will not. Of this remainder some of it will germinate after being placed in storage for periods varying from several months to several years. One explanation of this phenomena is that nature places an inhibition upon a certain percentage of the grain so as to preserve the species. By my experiment I have determined that the reason for this lack of germination power in grains arises from the manner of handling it, that is, the grain is cut before it is ripened and is permitted to stand on the harvest field for a certain period of time in order to cure it whereupon it is then thrashed. I have ascertained that if the grain is permitted to ripen until it falls to the ground that substantially all the kernels will germinate. Of course, it is impossible to handle the grain in such way as to bring about this result naturally. I have found that by placing this grain into a vacuum dryer and applying heat thereto in successive steps and alternating the heating and cooling stages, that this heating and cooling in the presence of a certain amount of moisture and then the drying of the grain to the required amount, artificially ripens the product so that its germination capability is greatly increased. In my experiments covering a large number of different grains and successive tests on each, show an improvement on the germination capability on all types over a range of from 5 to 35%. This operation occurs naturally in my improved drying process and is an important result thereof.

Another important result of drying the grain to the proper degree under a vacuum is that the amount of oxygen is so reduced there is no possibility of oxidizing the grain. This is highly important since it has been found that the vitamins are completely destroyed by oxidization and in addition the embryo of the kernels are injured. In a vacuum all the air in contact with the product is removed and consequently the oxidization spoken of as being necessary to destroy the vitamins, does not occur. In addition there is no possibility of the grain becoming mealy, which occurs from blistering in the usual methods of drying. This blistering is caused by the rapid evaporation of the moisture from the surface and the expansion of the kernel surface from the heat. In my novel vacuum method of drying, the heating of the grain occurs in successive steps, the drying being brought about by evaporation under the vacuum so that the grain is uniformly heated throughout and there is no tendency for rapid expansion of the surface alone. The formation of these surface blisters also retard the uniform drying of each kernel. When grain is dried by the usual processes the blisters formed become broken and ground into the grain and the grain becomes mealy. This not only destroys a portion of its nutritive value, vitamin content, and germination capabilities but renders it entirely unfit for handling in the usual courses of trade. This is particularly true of corn. The removal of the proper amount of moisture in the vacuum preserves texture, quality and color. Furthermore, by this process, all the nutritive elements and volatile oils are retained. In order to complete this drying process in the vacuum, it is necessary, as before mentioned, that heat be applied to the product. However, it is particularly difficult to heat the product in a vacuum to a proper degree to bring about the necessary drying and not produce complete destruction of many of the desirable characteristics that have been pointed out by oxidization. The explanation of this resides in the fact that in all grains and seeds a certain amount of oxygen, as well as other gases, is absorbed by the product and remains there. This oxygen if the temperature is sufficiently high in the vacuum and a proper degree of moisture is not present, will immediately cause combustion, thereby destroying the article so far as its food value is concerned, as well as its power to germinate. This absorbed oxygen and other gases may be designated by the term occluded gases. Another aspect of this same difficulty and perhaps a more serious one to overcome is to prevent this oxidization or combustion when the vacuum is broken after the product has been completely dried. The heating of the product in the vacuum is brought about by direct conduction and also by heating these occluded gases which serve to dry and heat by convection as set forth above. In a vacuum after heat has been applied to the product, it is retained for a considerable period of time, thus unless other precautions are taken when the grain is placed in the air, it is at substantially the highest temperature to which it has been raised during the drying process and the product is immediately oxidized or burned. The step by step temperature control as mentioned hereinbefore entirely obviates these difficulties. By employing this step by step method of vacuum drying, it is possible to pass the grain and seed continuously through the dryer thereby bringing about the required drying and curing operations in approximate interval of 30 minutes instead of many hours, as heretofore, in addition to obtaining all the desirable results pointed out above.

Referring now to the drawings:

Fig. 1 is a side elevation of my improved vacuum seed dryer showing the feeding inlet and outlet vacuum valves in sections.

Fig. 2 is the cross section of the same, along the line 2—2 of Fig. 1 looking in the direction of the arrows; and Fig. 3 is a partial vertical section along the line 3—3 of Fig. 2 looking in the direction of the arrows.

In the drawings, like reference characters refer to similar parts throughout.

The reference character 5 designates the chamber of the vacuum dryer generally, which is constructed of iron or other suitable material in a plurality of sections. The vacuum drying chamber over all for large quantity production may be from 30 to 50 feet high. The vacuum dryer 5 is formed of a plurality of square box-like sections 6 connected to each other through the extended portions 7. Each of the metal sections 6 has an outer wall forming a steam chest 9 on each side thereof, the inner and outer surfaces 8 and 11, respectively of the sections 6 being joined together by four upstanding flanges 10 of the wall 8, to which the other wall 11 is suitably fastened by bolts or otherwise. One of these flanges 10 has two oval shaped openings formed therein so as to permit passage of the fluid therethrough. The other three flanges are solid. These openings in the flanges 10 are in each instance adjacent the inlet and outlet connections 21 and 22 respectively. This connects the two steam chests at right angles to each other together, but separate from the other two, thereby forcing the heating and cooling fluid to circulate through the pipes 13. Thus the heating system of each section is separate and distinct from each of the others forming the dryer. The outer wall 11 of each section is provided with upstanding webs 12 intersecting at right angles for strengthening purposes. The inner walls 8 of each section have upstanding flanges 27 and 39 at each end to provide for easy assemblage of the various sections. A plurality of pipes 13 are arranged in layers and connected alternately to the steam chests formed on the side of each section through suitable openings in the inner walls 8 and welded thereto or otherwise held in place. I have found that while a number of rows of pipe in each section may be varied, that five rows give a very flexible arrangement. The positioning of the pipes in each section may be readily seen by referring to Figs. 2 and 3. It is to be noted that the pipes in alternate rows are staggered in order to provide an arrangement which will insure contact with all the grain as it passes therethrough under influence of gravity. There is an opening 14 provided in one side of the lower portion 7 of each section which may be sealed by a door 15 extending across the face thereof, and suitably bolted in place. The opening 14 is to permit the insertion of a screen 16 below each section, which is supported by rods 17 extending from wall to wall of any particular section. The screens 16 vary in mesh and are provided for the purpose of slowing the passage of grain through the dryer, that is, when certain species of grain are to be dried, no screens at all may be necessary as the passage of the grain through the dryer is sufficiently slow without them. However, screens of different mesh may be inserted in each section or any one of them to slow the progress of the grain through the dryer, depending upon its texture, as desired. There is an opening 18 provided in the lower portion 7 of the inner walls 8 of each section through which may be inserted a thermal control unit or tube 19 suitably held in place by a nut 20. This thermal control unit in most instances contains some type of fluid that expands rapidly as a result of heat. Sulphur dioxide is one of the fluids used. A steam and water inlet is provided by the pipe 21 extending into one of the corners of the steam chests in each section. An outlet pipe 22 extends into the steam chest at the lower end of the other corner. The proper mixture of water or water and steam so that the temperature of the fluid passing through the pipes in each section is controlled automatically by the thermal control element 19 and the bellows operating valve 22' which may be set to any desired temperature. This type of automatic temperature regulating valve is well known and may be of any suitable construction. A hand mixing valve 23 supplementing the automatic valve 22 is also provided. The valves 23 may also be of any well known or usual construction. These connections provide that the temperature of the various pipes in each section is maintained uniform. It is to be noted that the automatic thermal valve may be set so as to maintain the chamber in any section at any desired temperature. The upper portion 24 of the vacuum dryer is formed of metal and has a frustro-pyramidical shape, having a flanged lower edge 25 and a flanged upper edge 26. The flanged lower edge is suitably secured to the flange 27 of the upper section. One side of the upper portion contains a circular pipe-like opening 28 to which the vacuum outlet 29 leading to the usual vacuum pipe is connected. A screen 38 of desired mesh is suitably fastened over the opening. A vacuum valve 30 of any suitable construction containing a wheel 31 within a cylindrically shaped container is suitably attached to the flange 26 of the upper portion 24 of the vacuum dryer. The wheel 31 contains a number of paddles 33 axially distributed there around as the spokes of a wheel. This construction serves to maintain the vacuum sealed and at the same time permits grain to be fed from the hopper 34 attached to the upper portion of the vacuum inlet valve 32 into the vacuum dryer. The motion of the vacuum valve wheel 32 as it turns serves to distribute the grain evenly over the top of the pipes in the first section. An inverted U shape bracket 35 having one leg larger than the other is suitably affixed to one side of the upper portion 34 and serves to provide a base for an electric motor 36 that is connected by means of a belt 37 to a pulley not shown attached to the shaft of the vacuum inlet valve 30. The lower end of the dryer is closed by the funnel like metal portion 40 of an inverted frustro-pyramidical shape, suitably affixed by bolts or other means piercing its flanged end 41 to the lower flanged end 39 of the lower-most section 6. A vacuum outlet valve 42 is bolted to the lower end of the portion 40 and contains a moving element 43 similar to a paddle wheel which serves to maintain the vacuum sealed in the same manner as the vacuum valve 30. A U shape bracket 44 having one leg larger than the other serves to furnish a support for a motor 45 that drives the shaft of the vacuum valve 42 by means of a belt 46. Obviously one motor may drive both vacuum valves. The vacuum outlet valve 42 permits the grain to leave the dryer while maintaining the vacuum. Each of the various sections 6 comprising the drying portions of the dryer is connected through mixing valves 22 and 23 to the steam and water supply pipes 47 and 48 respectively. The return is through the pipe 49 which is connected in parallel to the various steam chests in the same manner as the pipes 22. These pipes are suitably connected to the boiler. The lower portion 40 of the dryer is also provided with an opening 53 into which is fitted a pipe 54 that also extends by way of the pipe 55 to the vacuum pump. A screen 58 also is suitably fastened over the opening 53 to prevent the grain passing into the pump. Both the pipes 55 and 29 are provided with a valve 56 and 57 respectively, so that the air may be taken from the chamber dryer from either or both ends by the vacuum pump which is suitably connected thereto through the usual condenser.

The dryer is suitably supported in an usual or well known manner such as a framework.

The automatic thermal valves that feed the heated fluid into each section are set so that in the first section the temperature will be approximately 180° F. for a typical grain. I have found that in the case of most grains, it is desirable that in a vacuum dryer having about twenty sections such as 6, that the first four sections be regulated to maintain this temperature. The thermal control valves on the second four sections will be arranged to provide a temperature of approximately 80° F. The third nine sections will provide a temperature of approximately 140° F. and the remaining sections a temperature of 50° F. These temperatures have been selected arbitrarily as designating the approximate temperatures, which would be ample to dry suitably a typical grain, such as wheat, rye, barley, etc. Of course, it is appreciated that in certain other grains, it may be necessary to vary these temperatures. By this arrangement the grain in its passage through the dryer is heated and then cooled and the same operation is repeated a second time. It is this alternate and step by step heating and cooling which brings about the desired results.

It is obvious that when a grain is heated in a vacuum to a certain temperature that it will maintain the temperature to which it is heated for a considerable period of time, vacuum being the best heat insulator known. The purpose of passing the grain through a cooling stage is merely to check the rise in temperature, which would otherwise have accumulative effect. The grain is cooled to some extent by direct conduction. It is then necessary to pass it through a heating stage at a temperature somewhat below the original heating stage, since a certain amount of heat has already been stored in the grain. Before it leaves the vacuum, it is then necessary to cool it down to normal temperature by direct conduction which is accomplished in the last stage. It has been stated that one of the valuable results of this vacuum drying is that there is no possibility of oxidization, for the reason that in a vacuum there is not sufficient oxygen to cause oxidization of the grain. However, should the grain leave the vacuum dryer in its heated condition, oxidization would immediately occur and the vitamin content of the grain would be seriously affected with its consequent effect, both on the nutritive property thereof and on its ability to germinate.

It will be appreciated that as soon as the grain is brought in contact with the heated pipes of the first sections, evaporation immediately begins and this evaporation is highly effective since it occurs at a reduced pressure where water boils at a relatively low temperature, depending upon the degree of vacuum. The vapors given off by the grain serve to penetrate the mass of grain and since they are heated also bring about a convection heating effect. This convection heating arising from the evaporated vapors which include not only the water vapor but all absorbed gases in the product, serve to heat the mass rapidly throughout and reduce the amount of drying time necessary. This super-heating is controlled by passing the grain through a cooling stage in order to prevent temperature rise to such a degree that the grain will become burnt. Even though the grain passes alternately through these heating and cooling stages, its temperature remains the same throughout until it reaches its last cooling stage where the temperature is materially reduced so that when it passes into the air, it will be cool and there will be no possibility of oxidization or further evaporation in the air. The reason that this last cooling stage has a substantially greater effect than the intermediate one arises by reason of the absence of superheated vapors at that point, there being no heated area of pipes below.

It will be appreciated that in addition to varying the temperatures of the different sections and the number of sections constituting one group for different types of grain, that it may be necessary in certain instances to slow the progress of the grain through the dryer so that the various groups of sections may have a better opportunity to perform their heating or cooling functions. This result is brought about by inserting screens of varying mesh in the doors 15 of one or more sections before the drying run of that grain is started. The mesh of the screen and the number of screens, as well as the sections at which they are inserted, is all determined by the kind of grain, as well as its type relative to moisture content and desired degree of drying.

I have determined that in order to bring a typical grain to a sufficient degree of dryness to provide a moisture content of substantially 17½% that the grain ought to pass through the dryer in substantially thirty minutes. Of course, this length of time may be varied by applying more or less heat at the different stages or varying their number or mechanically slowing their progress through the dryer in the manner set forth.

As before mentioned, by experiment I have ascertained that the reason for differences in the germination percentage of various grains is brought about by the manner in which they are handled and that if the grain were permitted to ripen on a stalk that substantially all the kernels will germinate. However, since it is impossible to accomplish this desirable result, naturally, it is necessary that the same be accomplished artificially. I have found as a result of experimentation that heating the grain and drying it in the manner described, whereby the grain passes through the vacuum dryer and is alternately heated and cooled serves to complete this ripening process. In addition, during this period, the texture of the grain, its color and nutritive and vitamin contents are all maintained, so that the embryo will have sufficient nourishment to encourage its germination and growth. This is impossible to achieve with any drying process employed theretofore.

The operation of my novel vacuum dryer in drying a typical grain will now be briefly described.

The grain is fed into the hopper 34 in any suitable manner. The vacuum inlet valve 32 serves to transfer this grain into the vacuum chamber and to scatter it more or less evenly over the pipes of the first section. The grain passes by gravity through the first section where it is heated by coming in contact with pipes having a temperature of approximately 180° F. Evaporation immediately starts to take place and the vapors are given off, it being understood that a very low air pressure or a relatively high vacuum is maintained by the vacuum pump through either or both of the outlets 29 and 56. As this grain passes downward through the various sections, the heated vapors arise and dry the product above it to a certain extent. These vapors are very efficacious in heating for the reason that it requires very little heat to raise them to a relatively high temperature so that the drying is accelerated to a great degree by their action. Of course these vapors transfer their heat to the grain encountered but since they encounter other heated pipes 13 they are immediately reheated so that they are acting to assist the drying continuously. The grain in passing downward through the dryer next encounters the cooling sections where the super-heated vapors are cooled to some extent so that the grain is not raised to a sufficiently high temperature to effect its volatile oil content or other nutritive properties thereof. The temperature of the grain is thus prevented from rising beyond control. As the grain travels downwardly it passes into the next heated section where it receives sufficient heat to continue its drying to the desired degree. Here again the heated vapors assist and accelerate the drying operation. Another effect of these heated vapors is that since they contain a considerable quantity of water vapor the grain is not permitted to dry too rapidly so as to prevent the formation of blisters. In addition the presence of this water vapor assists the drying operation of its own accord and serves to control it. The water vapor prevents any tendency for the grain to burn or oxidize as a result of the rapid drying through the use of these heated gases. That is, if the water vapor were not present in the gases, their effect would result in such rapid uncontrolled drying as to cause oxidization of the product with the consequent destruction of many valuable properties. By this combination process of drying employing both principles of direct conduction and convection, the kernels of the grain are heated throughout and the evaporation or drying occurs uniformly throughout each granule. This gives not only an even moisture content throughout the whole mass but provides an even moisture content throughout each granule. The grain now passes into the cooling sections where the temperature of the pipes 13 is low and where the super-heated vapors have very little effect, in fact, their effect is to accelerate the cooling operation. Since the vapors that are present lose their temperature quite rapidly, whatever effect they have at this stage is to accelerate the cooling. The grain now feeds into the vacuum outlet valve and is transferred to the car bin or other places of storage. As the grain meets the air, it is at substantially air temperature and the drying and curing process has been completed. The texture, color and quality of this grain has not been changed to any degree except to improve it by its passage through the vacuum dryer. In addition, the moisture content is substantially uniform throughout each kernel and each kernel is now ripened. Furthermore the germination capability of the grain is increased not only on account of the ripening or curing process to which it has been subjected but because of the presence of all of the mineral salts, nutritive oils and vitamins. Again should the granules be unduly hard so that the outside shell prevents or retards its ready germination it is softened and the grain is in such condition that it will germinate very rapidly. Furthermore, all the vitamins in the grain have been preserved, as well as the nutritive oils and mineral salts, starch content, etc., without change so that the food value of the seed or grain is greater than can be obtained in prior processes. The reduction of the moisture content and its uniform distribution throughout each kernel makes the grain of very high grade, relatively saleable and also permits it to be stored for long periods of time without danger of deterioration. Again, since the drying process prevents the formation of the so-called blisters the grain is firm and not mealy and marketable as of high quality.

It will be remembered that the vacuum dryer is provided with a vacuum outlet both at the top and bottom, each of which are fitted with screens in order to prevent any of the grain going into the vacuum pump. The purpose of employing two vacuum outlets is to provide an arrangement whereby the vacuum may be taken from either or both ends. By suitable regulation of these valves the direction of the heated vapors and their effect on the grain passing through can be varied as desired, to meet various conditions encountered both in the kind and type of grain and the degree of drying desired.

It will thus be seen that I have provided a novel process of drying and curing grains and like articles in commercial quantities in such manner as to preserve the various essential properties set forth above, as well as improving the germination capabilities of the grain to a large degree. It will be appreciated that this last result alone has a tremendous effect on the value of the grain for seed purposes and improves and increases its monetary value as well. The same is true with respect to the retention of the valuable vitamin and nutritive properties thereof. It appears from experiment and tests on a large variety of different species of grains and different kinds thereof that this heating and drying so as to obtain the proper water content by means of direct conduction and convection as described, serves to cure the grain and result in artificially ripening the grain so as to enable all the kernels to germinate.

While in the foregoing, I have shown automatic regulation of the mixing valves to procure the proper temperatures in the different zones and sections the same result may be secured by hand control. Furthermore, while I have arbitrarily designated the number of sections of the dryer used and the temperature maintained in various zones, it will be appreciated that these are varied in accordance with the results to be obtained and the product encountered. Thus, I have not only produced a novel method of drying and curing grains and the like, but have provided apparatus whereby the results may be obtained in a large commercial scale. For example, a dryer of the character set forth is capable of drying approximately 500 bushels of grain an hour. It is to be understood that the drying operation described, is a continuous one and easily adapts itself to mass production.

While I have described certain specific methods of drying and curing grains and the like, together with apparatus for securing this result commercially, I am aware that many changes and modifications and deviations can be made, but it will be understood that I do not desire to be limited to the specific methods and apparatus hereinbefore set forth, but desire to protect by Letters Patent all such modifications, changes and deviations, both in the method and apparatus described, as come within the scope of appended claims.

I claim:

1. The process of drying seed grains without destroying their germinating power which comprises the steps of passing said grains in vacuo through a zone in which they contact with heated areas; then passing them through a zone where they contact with cooled areas; then passing them through a second zone of heated areas, and thereupon through a second zone of cooled areas, and discharging said grains when cold into the atmosphere.

2. The process of drying seed grains so as to dry the same while at the same time enhancing their germinating power, which comprises the steps of heating the same in vacuum to remove a part of their moisture; thereupon, while still in vacuum, cooling the same, then again heating the same under vacuum and finally cooling the same under vacuum, whereby the initial moisture is rapidly removed while the residual moisture is more slowly removed.

3. The process of drying seed grains without destroying their germinating power, which consists in effecting a continuous discharge of seed grains to be dried through succeeding cycles of heating and cooling, concurrently with which said grains are constantly subjected to a maintained high and uniform vacuum, the final cycle being that of cooling the heated grains while they are still subjected to said vacuum.

4. The process of drying seed grains without destroying their germinating power, which consists in effecting a dispersed and continuous passage of seed grains to be dried through succeeding cycles of heating and cooling, concurrently with which said grains are constantly subjected to a maintained high and uniform vacuum, thereby causing said dispersed grains to be thoroughly dried and wholly treated by said succeeding cycles of heating and cooling, the final cycle being that of cooling the heated grains while they are still subjected to said vacuum.

5. The process of drying seed grain without destroying their germinating power, which consists in passing the same through succeeding cycles of heating and cooling, concurrently with which said grains are constantly subjected to a maintained high and uniform vacuum, said grains during their subjection to the first cycle of heating, being brought to temperatures to cause expansion of their cellular structures to a degree within the limits of their expansibility without rupturing the same, then during their immediately following subjection to the first cycle of cooling, having said expanded cellular structures contracted thereby, following which the grains are immediately subjected to another cycle of heating for re-expanding their cellular structures to degrees within the limits of their expansibility without rupturing the same, whereupon said heated and re-expanded grains are immediately subjected to another cooling cycle for re-contracting the re-expanded cellular structures thereof.

ALFRED H. McCOMB.